UNITED STATES PATENT OFFICE.

EMIL MEYER, OF BERLIN, GERMANY.

PROCESS OF OBTAINING METHYL ALCOHOL FROM WOOD-PULP LYES.

SPECIFICATION forming part of Letters Patent No. 407,442, dated July 23, 1889.

Application filed January 8, 1889. Serial No. 295,775. (No specimens.) Patented in Germany December 13, 1887, No. 45,951.

*To all whom it may concern:*

Be it known that I, EMIL MEYER, doctor of philosophy, of Berlin, in the Kingdom of Prussia and German Empire, a subject of the King of Prussia, have invented a new Means for Producing Wood Naphtha and the Like from the Liquors Obtained by the Wood-Fiber Process, (no patents being obtained by me anywhere for this invention, save in Germany, No. 45,951, dated December 13, 1887,) of which the following is a specification.

My invention relates to new means for producing wood naphtha and the like from the liquors obtained by the wood-fiber process.

In the production of chemical wood fiber nearly one-half or more of the dry mass of the wood is dissolved by the cooking lyes. Methyl combinations (wood naphtha) can be obtained from these dissolved materials through carbonization in retorts and condensing the gas; but, owing to the difficulty of treating the thick sirup-like lyes, the recovery of the alkaline salts has hitherto only been effected by simply burning the material.

The soda-pulp lye may be concentrated to 31° and even 35° Baumé, (1.26 to 1.33 specific gravity.) If such concentrated lye, instead of being burned in retorts, as hitherto, is mixed with forty to fifty-five parts, by weight, of charcoal, either by dipping dry pieces of charcoal into hot strong lye or by mixing powdered charcoal with the lye, so as to form a plastic mass, uniform, durable, and transportable pieces may be formed, allowing of further drying in a heating-chamber. Further, these pieces or bricks may, though containing the original volume of water, be placed into red-hot retorts without injuring the latter through sudden cooling and without losing their form during carbonization.

I have made mixtures of one hundred kilos charcoal in pieces (occupying, including air-spaces between the pieces, a space of from six hundred to seven hundred liters, or, if in the form of powder, a volume of four hundred liters) with one hundred and forty liters of lye of 31° Baumé, (1.26 specific gravity,) weighing one hundred and eighty-six kilos. The pieces obtained, weighing thus two hundred and eighty-six kilos, required retort-space of eight hundred to nine hundred liters. A plastic mixture of the above proportions prepared with powdered charcoal will yield sharp-edged pieces when pressed in a brick-making or similar press.

The distillation, the steaming and cooling of the residue of the charcoal, the absorption of the tar, gas-water, and gas are the same as in hitherto known processes. Only the distillate itself differs from that of the ordinary retort wood carbonization, inasmuch as formic acid, acetic acid, &c., and the other acid-tar combinations do not appear; but, as usual, methylic alcohol, acetone, &c., and various amine combinations are dissolved in the distillation-water, and I also obtain tar of a different character.

The advantages gained are that instead of copper iron may be used for the condensation-vessels, and in the rectification of the gas-water in consequence of the absence of acetic acid the volatile valuable products may be obtained by only a small amount of distillation. If the acid lyes of the sulphite cellulose process are to be treated in this manner, the free acid is to be neutralized. Further, as the dissolved lime would ultimately render the residue of the charcoal valueless by its accumulation, it is advisable to eliminate the same as gypsum by adding sulphate of soda, which is ultimately always regained from the charcoal. In the distillation of sulphite lyes, and also alkaline lyes containing sulphuret of sodium, generally known as "sulphite cellulose," there are formed, besides acetone and methylic alcohol, other volatile sulphurous combinations—such as mercaptan and oil of mustard—which are either entirely condensed or rendered harmless during the combustion of the gas with which they are mixed. These pieces or bricks almost entirely retain their shape after burning and allow of their being removed, even when hot, by means of rakes to the cooling-vessels. If, however, it is of importance to retain the sharp edges of the bricks, they are burned in the well-known movable retorts, which allow of the contents being cooled without being touched.

The accumulated dust is carefully collected on account of the alkali contained therein, and is placed upon the large pieces during the lixiviation which is proceeded with afterward. As the lixiviation of the soda salts must be effected very completely, a number of vessels with perforated removable bottoms are required, which, in well-known manner, allow of complete exhaustion of the residue and of obtaining a strong alkali solution, which is again used for the cellulose cooking process. After the exhaustion of the charcoal the same is used again for mixing with concentrated lye, and only the surplus corresponding to the charcoal gained from the dissolved wood fiber or cellulose is dried in drying-chambers at a moderate temperature, and may be used as fuel for heating railway-carriages, &c.

What I claim, and desire to secure by Letters Patent of the United States, is—

1. The process of treating lyes produced in the manufacture of wood pulp, which consists of the following successive steps: first, concentrating said lyes; secondly, mixing the concentrated lyes with charcoal and forming the mass into briquettes; thirdly, roasting the briquettes, and, lastly, condensing the products of distillation, substantially as set forth.

2. In the process of treating lyes produced in the manufacture of wood pulp, the method herein described of regaining the charcoal for further use by lixiviating the same and remixing it with concentrated lyes, substantially as set forth.

In witness whereof I have hereunto set my my hand in presence of two witnesses.

EMIL MEYER.

Witnesses:
W. BINDEWALD,
B. ROI.